United States Patent [19]

Suzuki et al.

[11] Patent Number: 4,527,060
[45] Date of Patent: Jul. 2, 1985

[54] RADIATION IMAGE READ-OUT METHOD AND APPARATUS

[75] Inventors: Toshiaki Suzuki; Kazuo Horikawa, both of Minami-ashigara, Japan

[73] Assignee: Fuji Photo Film Co., Ltd., Japan

[21] Appl. No.: 434,886

[22] Filed: Oct. 18, 1982

[30] Foreign Application Priority Data

| Oct. 16, 1981 | [JP] | Japan | 56-165111 |
| Oct. 16, 1981 | [JP] | Japan | 56-165112 |
| Oct. 16, 1981 | [JP] | Japan | 56-165113 |
| Oct. 16, 1981 | [JP] | Japan | 56-165114 |
| Oct. 16, 1981 | [JP] | Japan | 56-165115 |

[51] Int. Cl.³ .............................. G03C 5/16
[52] U.S. Cl. .............................. 250/327.2; 250/484.1
[58] Field of Search .................. 250/327.2, 484.1, 337; 364/414

[56] References Cited

U.S. PATENT DOCUMENTS 4,284,889  8/1981  Kato et al. .................. 250/354.1

Primary Examiner—Alfred E. Smith
Assistant Examiner—Carolyn E. Fields
Attorney, Agent, or Firm—Murray, Whisenhunt & Ferguson

[57] ABSTRACT

In a radiation image read-out system in which a stimulable phosphor sheet carrying a radiation image stored thereon is exposed to a stimulating ray which causes it to emit light in the pattern of the stored image, and the emitted light is photoelectrically read out, preliminary read-out is conducted to investigate the image input information on the phosphor sheet by use of a stimulating ray having stimulation energy lower than stimulation energy in final read-out for obtaining a visible image. The image input information is displayed, e.g., on a CRT to manually set final read-out and image processing conditions or directly sent to a control circuit for automatically setting them. Preliminary and final read-out sections are formed separately, or a single read-out section is used to conduct both read-out steps.

23 Claims, 6 Drawing Figures

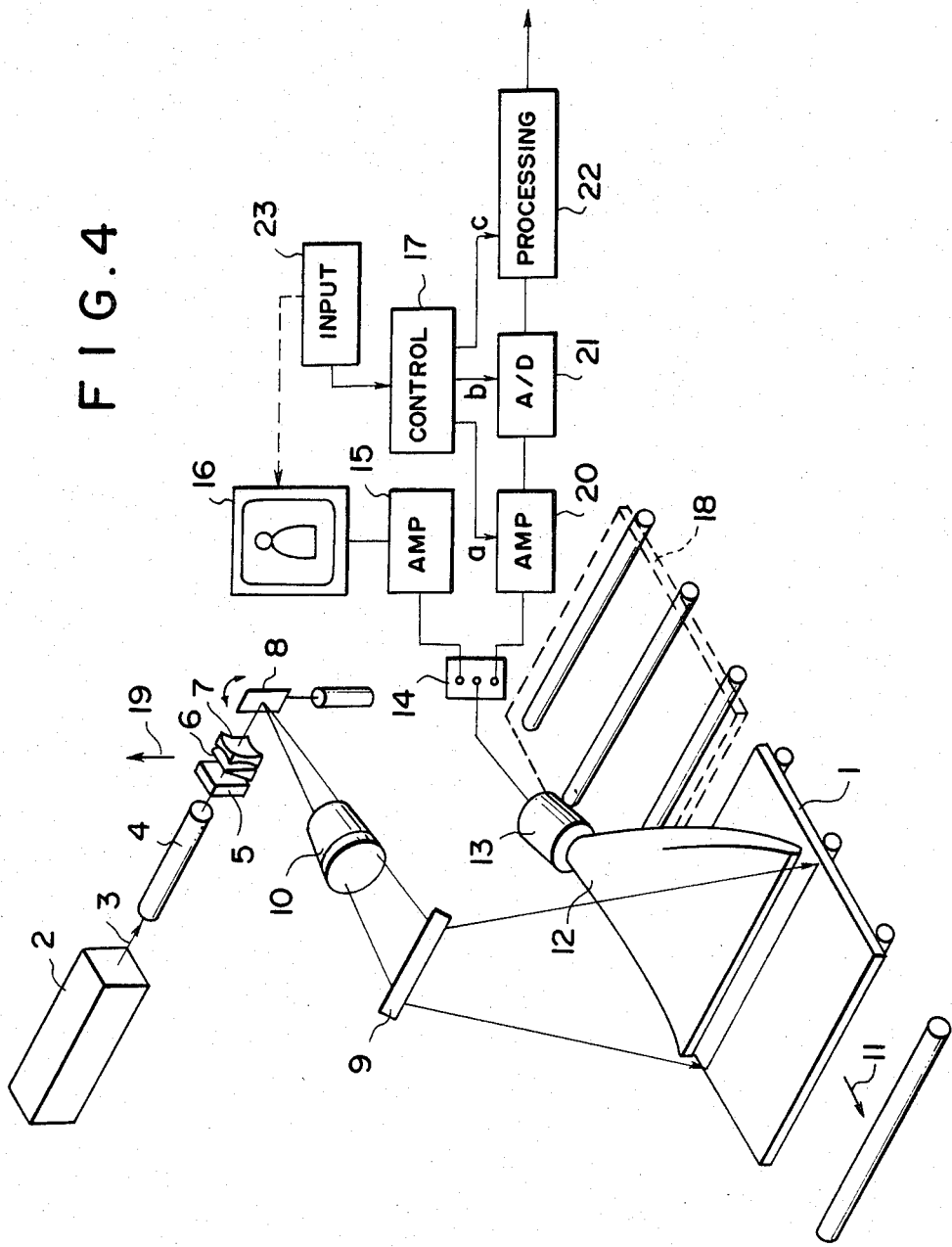

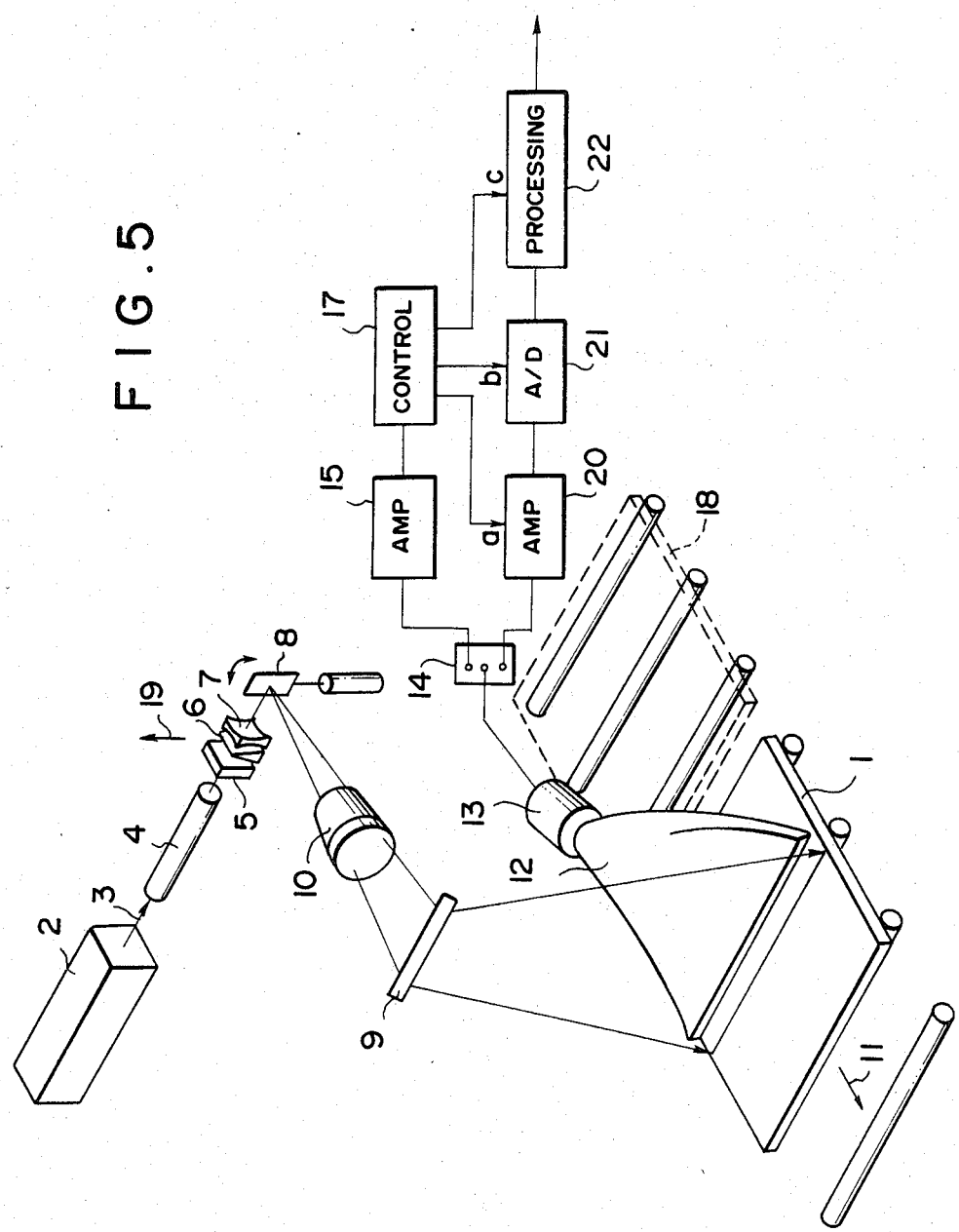

RADIATION IMAGE READ-OUT METHOD AND APPARATUS

BACKGROUND OF THE INVENTION

1. Field of the Invention

This invention relates to a radiation image read-out method in which a stimulable phosphor sheet carrying a radiation image stored thereon is exposed to a stimulating ray which causes it to emit light in the pattern of the stored image, and the emitted light is photoelectrically read out by a photodetector, and apparatus for carrying out the method.

2. Description of the Prior Art

When certain kinds of phosphors are exposed to such radiation as X-rays, $\alpha$-rays, $\beta$-rays, $\gamma$-rays or ultraviolet rays, they store a part of the energy of the radiation. Then, when the phosphor which has been exposed to the radiation is exposed to a stimulating ray such as a visible ray, light is emitted from the phosphor in the pattern of the stored energy of the radiation. A phosphor exhibiting such properties is referred to as a stimulable phoshor.

As disclosed in U.S. Pat. No. 4,258,264 and Japanese Unexamined Patent Publication No. 56(1981)-11395, it has been proposed to use a stimulable phosphor in a radiation image recording and read-out system. Specifically, the stimulable phosphor formed on a sheet is first exposed to a radiation transmitting through an object to have a radiation image stored therein, and is then scanned with a stimulating ray such as laser beam which causes it to emit light in the pattern of the stored image. The light emitted from the stimulable phosphor sheet upon stimulation thereof is photoelectrically detected and converted to an electric image signal, which is processed as desired to reproduce an visible image on a recording medium such as photographic light-sensitive material or on a display such as cathode ray tube (CRT).

This radiation image system using the stimulable phosphor sheet is advantageous over the conventional radiography using a silver halide photographic material in that the image can be recorded over a very wide range of radiation exposure and further in that the electric signal used for reproducing the visible image can be freely processed to improve the image quality for viewing and diagnostic purposes. In more detail, since the amount of light emitted upon stimulation after the radiation energy is stored in the phosphor varies over a very wide range in proportion to the amount of energy stored therein, it is possible to obtain an image having desirable density regardless of the amount of exposure of the phosphor to the radiation by reading out the emitted light with an appropriate read-out gain and converting it to an electric signal to reproduce a visible image on a recording medium or a display. The electric signal may further be processed as desired to obtain a radiation image suitable for viewing and diagnostic purposes. This is very advantageous in practical use.

As mentioned above, in the radiation image system using a stimulable phosphor, deviation of the level of the radiation energy stored in the stimulable phosphor from a desired level can easily be compensated by setting the read-out gain to an appropriate value when photoelectrically reading out the light emitted from the stimulable phosphor upon stimulation thereof. Therefore, the quality of the reproduced radiation image is not adversely affected by a change in radiation dose due to fluctuating tube voltage or MAS value of the radiation source, a variation in the sensitivity of the stimulable phosphor or the photodetector, a change in radiation dose according to the condition of the object, or a change in the radiation transmittance according to the object etc. Further, it is possible to obtain a desirable radiation image even when the radiation dose to the object is reduced. Further, it is possible to obtain a radiation image having high image quality of high contrast, high sharpness and low noise etc. by once converting the light emitted from the stimulable phosphor into an electric signal, and processing the electric signal as desired. Particularly, when the radiation image is used for medical diagnosis, it is possible to obtain a radiation image processed in accordance with the portion of a human body such as the heart, the chest etc. and improve the diagnostic efficiency and accuracy.

However, in order to eliminate various influences based on the fluctuation of radiographic conditions and/or obtain a radiation image having a high image quality or a high diagnostic efficiency and accuracy, it is necessary to investigate the image input condition of the radiation image stored on the stimulable phosphor sheet or the image input pattern, which is determined by the radiographic method such as portion image (e.g. chest and abdomen), plain image or contrasted image radiographing, before reproducing the radiation image to a visible image, and appropriately adjust the read-out gain or appropriately process the electric signal based on the investigated image input condition or the image input pattern. The image input condition and the image input pattern will hereinafter be simply referred to as the image input information when they should be expressed generically. It is also necessary to determine the scale factor to optimize the resolution according to the contrast of the image input pattern.

The investigation of the image input information may be conducted prior to the visible image reproduction by use of the method disclosed in U.S. Pat. No. 4,284,889, which is based on the observation that the amount of light instantaneously emitted from the stimulable phosphor sheet upon exposure thereof to a radiation is proportional to the amount of the radiation energy stored in the stimulable phosphor. In this method, image input information is investigated by detecting the instantaneously emitted light, and an appropriate signal processing is conducted based on the image input information in order to obtain a visible radiation image having a high diagnostic efficiency and accuracy. With this method, since it is possible to appropriately adjust the read-out gain, select an appropriate scale factor, or conduct an appropriate signal processing, a radiation image suitable for viewing and diagnostic purposes can be obtained regardless of fluctuation of the radiographic conditions. However, since the radiation image input section and the radiation image read-out section are usually substantially spaced apart from each other, a signal transfer system must be formed therebetween, necessitating a complicated apparatus and a high cost.

Further, U.S. Pat. No. 4,276,473 discloses a method of estimating the image input condition or image input pattern of a radiation image stored in the stimulable phosphor by positioning a non-stimulable phosphor in the vicinity of the stimulable phosphor sheet, and detecting the light emitted from the non-stimulable phosphor upon exposure thereof to a radiation by use of a photodetector. However, this method also has the same drawback as that of the method disclosed in aforesaid U.S. Pat. No. 4,284,889. Further, since the stimulable phosphor for recording the radiation image in not used to detect the image input information, it is impossible to correctly investigate the image input information.

SUMMARY OF THE INVENTION

The primary object of the present invention is to provide a method of and apparatus for simply and accurately detecting the image input information of a radiation image stored in a stimulable phosphor prior to the read-out operation for obtaining a visible image for viewing and diagnostic purposes.

Another object of the present invention is to provide a method of and apparatus for simply and accurately detecting the image input information of a radiation image stored in a stimulable phosphor prior to the read-out operation for obtaining a visible image for viewing and diagnostic purposes, and reproducing a radiation image having a high diagnostic efficiency and accuracy based on the detected image input information.

Other and further objects of the present invention will appear more fully from the following description.

The above objects are accomplished by conducting a read-out operation for investigating the image input information of a radiation image stored in a stimulable phosphor (hereinafter referred to as the preliminary read-out) by use of a stimulating ray having stimulation energy lower than stimulation energy of a stimulating ray used in a read-out operation for obtaining a visible image for viewing and diagnostic purposes (hereinafter referred to as the final read-out), thereafter conducting the final read-out. In the final read-out, the read-out gain is adjusted, and/or the scale factor is determined, and/or the image processing conditions are determined appropriately based on the image input information obtained by the preliminary read-out. The read-out gain and the scale factor are together referred to as the read-out conditions. The use of the preliminary read-out step prior to the final read-out is unexpected since the preliminary read-out results in dissipation of the radiation energy stored in the stimulable phosphor and since the amount of light emitted from the stimulable phosphor upon stimulation thereof by a stimulating ray is very small even when a stimulable phosphor having the highest sensitivity among those available now is selected and it was considered important to detect as much possible light as possible with a photodetector, as described in U.S. Pat. Nos. 4,258,264 and 4,302,671, and U.S. Pat. No. 4,346,295.

The stimulation energy referred to in this invention means the effective energy of the stimulating ray which the stimulable phosphor sheet receives per unit area.

In the present invention, the stimulation energy of the stimulating ray applied to the stimulable phosphor in the preliminary read-out should be lower than the stimulation energy of the stimulating ray used in the final read-out. As the ratio of the stimulation energy of the stimulating ray in the preliminary read-out to the stimulation energy of the stimulating ray in the final read-out increases near to 1, the amount of the radiation energy remaining in the stimulable phosphor after the preliminary read-out decreases. It has been found that, when the ratio is smaller than 1, it is possible to obtain a radiation image suitable for viewing and diagnostic purposes by appropriately adjusting the read-out gain. However, in order to obtain a radiation image having a high diagnostic efficiency and accuracy, the aforesaid ratio should preferably be as small as possible insofar as the image input information of the radiation image stored in the stimulable phosphor can be detected sufficiently to determine the read-out conditions or the image processing conditions, that is, insofar as the light emitted from the stimulable phosphor in the preliminary read-out can be detected sufficiently for the above-mentioned purposes. Thus, the aforesaid stimulation energy ratio should generally be 50% or less, preferably 10% or less, more preferably 3% or less. The lower limit of this ratio is determined according to the accuracy of the system for detecting the light emitted from the stimulable phosphor in the preliminary read-out.

In order to make the stimulation energy of the stimulating ray in the preliminary read-out smaller than the stimulation energy of the stimulating ray in the final read-out, it is possible to use any known method. For example, the output level of the laser source used in the preliminary read-out may be decreased, the beam diameter of the laser beam may be increased, the scanning speed of the laser beam may be increased, or the moving speed of the stimulable phosphor sheet may be increased.

In the present invention, it is preferable that the preliminary read-out be conducted within one hour before the final read-out. Since the radiation energy stored in the stimulable phosphor fades with time, the interval between the preliminary read-out and the final read-out should be minimized in order to effectively use the image input information obtained in the preliminary read-out for the final read-out. Experiments conducted by the inventors revealed that the degree of the fading of the radiation energy stored in the stimulable phosphor is highest immediately after a radiation image is recorded on the stimulable phosphor, and about 10% of the radiation energy is dissipated about one hour after the recording, followed by decrease in the fading speed. It has also been found that, when the difference between the amount of the radiation energy stored at the time of preliminary read-out and that at the time of final read-out is 10% or less, it is possible to obtain a radiation image having a practically sufficient diagnostic efficiency and accuracy by detecting the image input information of the radiation image stored in the stimulable phosphor by use of the image input information obtained in the preliminary read-out, and setting the final read-out conditions or conducting the signal processing after the read-out by use of the detected image input information. Accordingly, when the interval between the preliminary read-out and the final read-out is one hour or less, the difference in the amount of the radiation energy stored in the stimulable phosphor between the preliminary read-out and the final read-out is 10% or less, and it is possible to obtain a radiation image having a practically sufficient diagnostic efficiency and accuracy.

In the present invention, since the image input condition of a radiation image stored in the stimulable phosphor can be investigated in advance, it is possible to obtain a radiation image having a high diagnostic efficiency and accuracy regardless of fluctuation of the radiographic conditions by adjusting the read-out gain based on the investigated image input information without using a read-out system having a wide dynamic range. Further, since the image input pattern of the radiation image stored in the stimulable phosphor can be investigated in advance, it is possible to obtain a radiation image having a high diagnostic efficiency and accuracy by processing the read-out electric signal suitable according to the image input pattern, and/or by optimizing the scale factor. It is also possible to reduce the read-out time by omitting the final read-out for a portion of the stimulable phosphor carrying no image input pattern.

In the present invention, in order to improve the signal-to-noise ratio, it is preferable that the stimulable phosphor emits light having a wavelength range not overlapping upon the range of wavelength of the stimulating ray employed to excite the stimulable phosphor. Preferably, when a laser source which emits stimulating ray having a wavelength within the range between 600 nm and 700 nm, such as a He-Ne laser, is used, a stimulable phosphor which emits light having a wavelength within the range between 300 nm and 500 nm should be selected, as disclosed in U.S. Pat. No. 4,258,264.

Further, in order to increase the amount of light read out from the stimulable phosphor and shorten the read-out time, it is preferable to use a gas ion laser source emitting a laser beam having a wavelength range shorter than 600 nm, such as an $Ar^+$ laser beam (488 nm, 514.5 nm), a $Kr^+$ laser beam (520.9 nm, 530.9 nm, 568.2 nm), or an $Ar^+$-$Kr^+$ laser beam.

As the stimulable phosphor, for example, rare earth activated alkaline eart metal fluorohalide phosphor is preferred. One example of this phosphor is, as shown in DE-OS No. 2,928,245, a phosphor represented by the formula $(Ba_{1-x-y},Mg_x,Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$. Another example of this phosphor is, as shown in U.S. Pat. No. 4,239,968, a phosphor represented by the formula $(Ba_{1-x},M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS:Cu,Pb; $BaQ.Xal_2O_3:Eu$ wherein $0.8 \leq x \leq 10$; and $M^{II}O.x SiO_2:A$ wherein $M^{II}$ is Mg, Ca, Sr, Zn, Cd or Ba, A is Ce, Tb, Eu, Tm, Pb, Ti, Bi or Mn, and x is number satisfying $0.5 \leq x \leq 2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. Among the above enumerated phosphors, the rare earth activated alkaline earth metal fluorohalide phosphor is the most preferable, among which barium fluorohalides are the most preferable in view of the high intensity of emission of light.

Further, barium fluorohalide phosphors added with a metal fluoride as disclosed in Japanese Unexamined Patent Publication Nos. 56(1981)-2385 and 56(1981)-2386, or barium fluorohalide phosphors containing at least one of a metal chloride, a metal bromide and a metal iodide as disclosed in European Patent Publication No. 29,963 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in U.S. Pat. No. 4,394,581.

As for the signal processing, it is possible to employ a frequency processing as disclosed in U.S. Pat. No. 4,315,318 or U.S. Pat. No. 4,387,428, and a gradation processing as disclosed in U.S. Pat. Nos. 4,302,672, 4,276,473 or 4,310,886.

BRIEF DESCRIPTION OF THE DRAWINGS

FIG. 4 is a schematic diagram showing a further embodiment of the apparatus in accordance with the present invention, FIG. 5 is a schematic diagram showing a still further embodiment of the apparatus in accordance with the present invention.

DESCRIPTION OF THE PREFERRED EMBODIMENTS

The present invention will hereinbelow be described in further detail with reference to the accompanying drawings.

Figure 1:
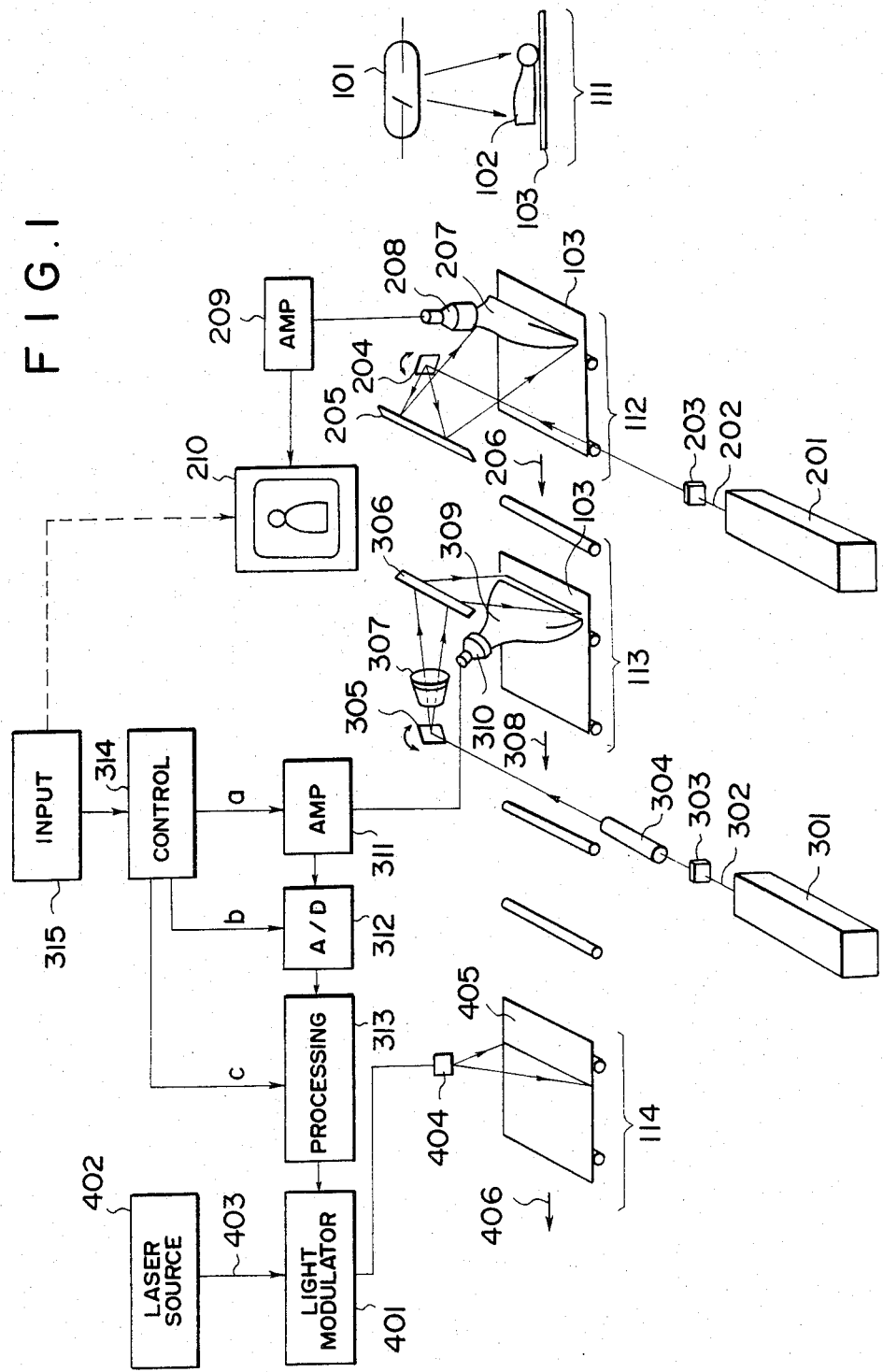
FIG. 1 is a schematic view showing the whole system of the radiation image recording system in which an embodiment of the radiation image read-out apparatus in accordance with the present invention is employed.

FIG. 1 schematically shows a radiation image recording system in which an embodiment of the radiation image read-out apparatus in accordance with the present invention is employed, and which comprises an image input section 111, a preliminary read-out section 112, a final read-out section 113 and recording section 114.

In the image input section 111, X-rays emitted from an X-ray source pass through an object 102 and are absorbed into a stimulable phosphor sheet 103 to have an X-ray image of the object 102 stored thereon. The phosphor sheet 103 carrying the X-ray image stored thereon is then sent to the preliminary read-out section 2.

In the preliminary read-out section 12, a laser beam 202 emitted from a laser source 201 is first passed through a filter 203 for cutting off the light beam having a wavelength within a range identical with the range of the wavelength of the light emitted from a stimulable phosphor sheet 103 upon stimulation by the laser beam 202. Then, the laser beam 202 is one-dimensionally deflected by a light deflector 204 such as galvanometer mirror and directed onto the stimulable phosphor sheet 103 by a plane reflection mirror 205. While the laser beam 202 impinges upon the stimulable phosphor sheet 103, the phosphor sheet 103 is moved in the direction of the arrow 206 (subsidiary scanning direction) and, consequently, the whole area of the phosphor sheet 103 is exposed to and scanned with the laser beam 202. The power of the laser source 201, the beam diameter of the laser beam 202, the scanning speed of the laser beam 202, and the moving speed of the phosphor sheet 103 are selected so that the stimulation energy of the laser beam 202 for preliminary read out is smaller than the stimulation energy of the laser beam for final read out. When exposed to the laser beam 202, the stimulable phosphor sheet 103 emits light in the pattern of the X-ray energy stored therein, and the emitted light enters a light guiding sheet 207. The light guiding sheet 207 has a linear light input face positioned close to the scanning line on the stimulable phosphor sheet 103, and a ring-shaped light output face in close contact with the light receiving face of a photodetector 208, which may be a photomultiplier. The light guiding sheet 207 is formed of a transparent thermoplastic resin sheet such as an acrylic resin sheet so that the light entering from the light input face can be transmitted to the light output face by total reflection through the interior of the light guiding sheet 207. The light emitted from the stimulable phosphor sheet 103 upon stimulation thereof is guided in the interior of the light guiding sheet 207, emitted from the light output face of the light guiding sheet 207 and received by the photodetector 208. The light guiding sheet 207 may be of a shape and a material as disclosed in U.S. Pat. No. 4,346,295 or European Patent Publication No. 32,521.

The light receiving face of the photodetector 208 is provided with a filter for transmitting only the light having the wavelength distribution of the light emitted from the stimulable phosphor sheet 103 and cutting off the light having the wavelength distribution of the stimulating ray, so that the photodetector 208 can detect only the light emitted from the stimulable phosphor sheet 103 upon stimulation thereof. The output of the photodetector 208 is amplified by an amplifier 209 and displayed as a visible image on an output unit 210 such as a CRT. By watching the visible image, it is possible to investigate the image input information of the X-ray image, i.e. the image input condition or the image input pattern prior to the final read-out. When the preliminary read-out is finished as described above, the stimulable phosphor sheet 103 is sent to the final read-out section 113.

In the final read-out section 113, a laser beam 302 emitted from a laser source 301 is first passed through a filter 303 for cutting off the light beam having a wavelength within the range identical with the range of the wavelength of the light emitted from the stimulable phosphor sheet 103 upon stimulation by the laser beam 302. Then, the beam diameter of the laser beam 302 is strictly adjusted by a beam expander 304. The laser beam 302 is then deflected by a light deflector 305 formed of a galvanometer mirror the like, and directed onto the stimulable phosphor sheet 103 by a plane reflection mirror 306. Between the light deflector 305 and the plane reflection mirror 306 is positioned an $f\theta$ lens 307 for maintaining the beam diameter of the laser beam 302 uniform during the scanning of the laser beam 302 on the stimulable phosphor sheet 103. While the laser beam 302 impinges upon the stimulable phosphor sheet 103, the phosphor sheet 103 is moved in the direction of the arrow 308 and, consequently, the whole area of the phosphor sheet 103 is exposed to and scanned with the laser beam 302. Upon exposure to the laser beam 302, the stimulable phosphor sheet 103 emits light in the pattern of the X-ray energy stored therein, and the light emitted enters a light guiding sheet 309 which is made of the same material and has the same construction as the light guiding sheet 207 used for preliminary read-out. The light emitted from the stimulable phosphor sheet 103 is guided in the interior of the light guiding sheet 309 through total reflection, emitted from the light output face of the light guiding sheet 309 and received by a photodetector 310. The light receiving face of the photodetector 310 is closely contacted with a filter for selectively transmitting only the light having the wavelength distribution of the light emitted from the stimulable phosphor sheet 103, so that the photodetector 310 can detect only the light emitted therefrom. The output of the photodetector 310 is amplified by an amplifier 311, A/D converted by an A/D converter 312, and processed by a signal processing circuit 313 to obtain an X-ray image having a high diagnostic efficiency and accuracy. The amplification degree of the amplifier 311, the scale factor of the A/C converter 312, and the signal processing conditions in the signal processing circuit 313 can be set to optimal values by manually operating a control circuit 314 with an input unit 315 based on the image input information investigated with the visible image obtained at the preliminary read-out section 112. Further, since the position of the phosphor sheet 103 relative to the radiation image read-out apparatus can be found by watching the visible image displayed on the output unit 210 such as a CRT, it is possible to accurately determine the relative position of the phosphor sheet 103 by installing a control zone prior to the final read-out system when a superposition method or a subtraction method requiring high precision positioning is used. The electric image signal obtained from the signal processing circuit 313 is sent to a light modulator 401 at the recording section 114.

In the recording section 114, a laser beam 403 emitted from a recording laser source 402 is modulated by the light modulator 401 based on the electric image signal, and directed onto a light-sensitive material 405 such as a photographic film by a scanning mirror 404 for scanning the light-sensitive material 405 with the laser beam 403. At this time, the light-sensitive material 405 is moved perpendicularly to the scanning direction, i.e. in the direction of the arrow 406. Accordingly, the X-ray image is recorded on the light-sensitive material 405.

Figure 2:
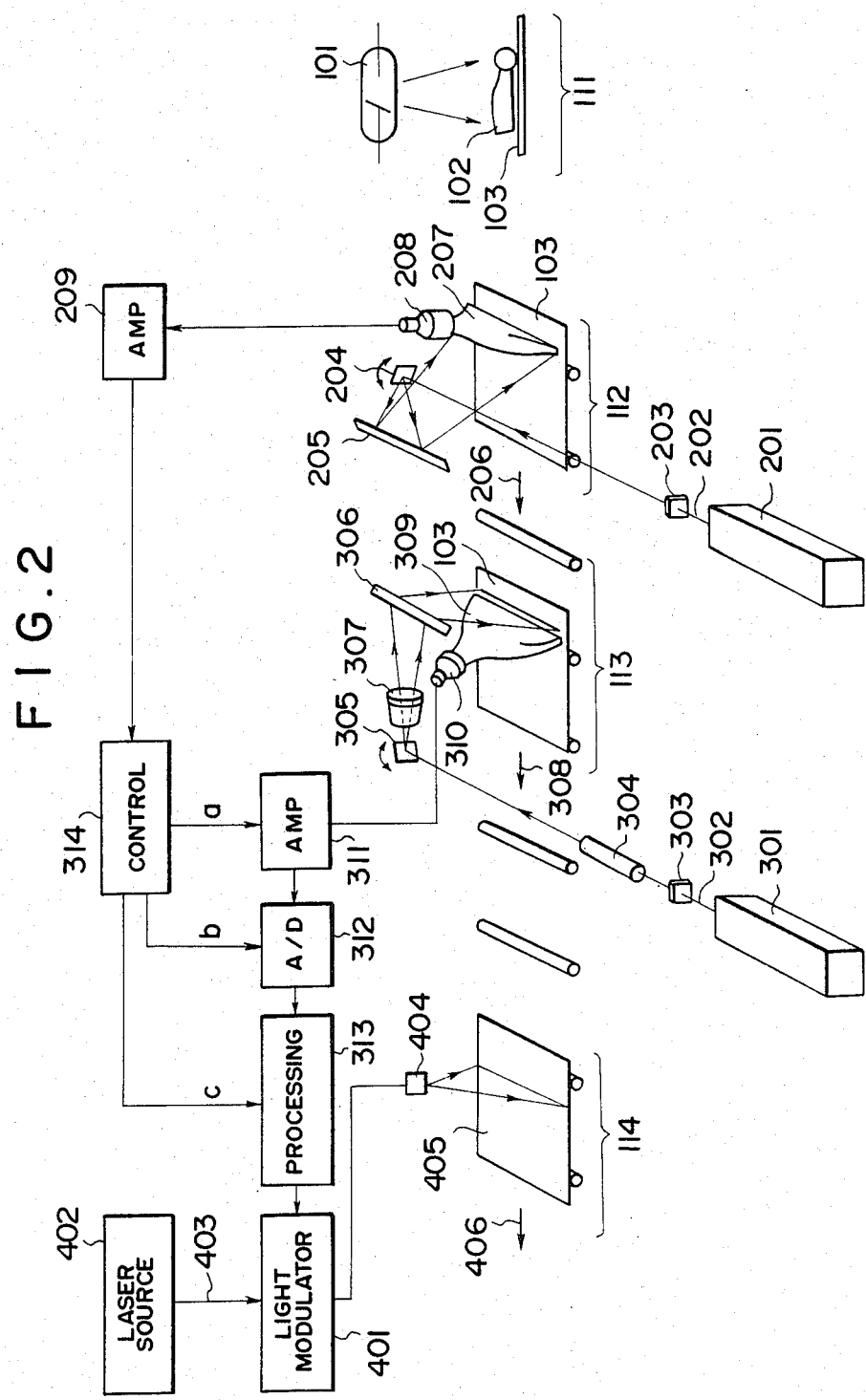
FIG. 2 is a schematic view showing the whole system of the radiation image recording system in which another embodiment of the apparatus in accordance with the present invention is employed.

FIG. 2 schematically shows a radiation image recording system in which another embodiment of the apparatus in accordance with the present invention is employed. The system shown in FIG. 2 is similar to that shown in FIG. 1, except that the read-out conditions and the image processing conditions in the final read-out operation are automatically controlled by use of the image input information of the X-ray image stored in the stimulable phosphor, which is obtained in the preliminary read-out. Namely, the light emitted from the phosphor sheet 103 upon stimulation thereof and detected by the photodetector 208 in the preliminary read-out is converted to an electric signal, and then amplified by the amplifier 209. The image input information of the X-ray image obtained from the amplifier 209 is sent to the control circuit 314 at the final read-out section 113. On the basis of the image input information, the control circuit 314 generates an amplification degree setting value (a), a scale factor setting value (b) and an image processing condition setting value (c). The light emitted from the phosphor sheet 103 and detected by the photodetector 310 in the final read-out is converted to an electric signal, amplified to an appropriate level by an amplifier 311 the sensitivity of which has been set by the amplification degree setting value (a), and then inputted into an A/D converter 312. In the A/D converter 312, the electric signal is converted to a digital signal with a scale factor which has been set by the scale factor setting value (b) to suit the width of signal fluctuation. The digital signal thus obtained is inputted into a signal processing circuit 313, in which it is processed based on the image processing condition setting value (c) so as to obtain an X-ray image suitable for viewing and diagnostic purposes. The image signal is then sent to the light modulator 401 at the recording section 114, in which the X-ray image is recorded as a visible image in the same way as described with reference to FIG. 1.

In general, the radiation dose changes by a factor of about two digits according to the usually employed radiographic method or radiographic conditions. Further, the current value obtained by photoelectric conversion of a radiation image stored on a stimulable phosphor sheet changes by a factor of about two digits or more according to the objects. Therefore, a read-out system capable of detecting the light amount range of about four digits or more is required at least at the preliminary read-out section. However, it is practically very difficult to conduct read-out covering such a wide dynamic range. Further, since a stimulating ray of a low level is employed and the amount of light emitted from the stimulable phosphor is small in the preliminary read-out, it becomes difficult to preliminarily read out the radiation image with a high accuracy due to the adverse effects of (1) a dark current of a photomultiplier, (2) weak external light inevitably entering the system in spite of a light shielding means, and (3) a stimulating ray which cannot be cut by the filter installed on the front face of the photomultiplier (because the power of the stimulating ray is larger by a factor of several digits than the power of the light emitted from the stimulable phosphor upon stimulation thereof).

The aforesaid problem in the preliminary read-out can be solved by placing a substance having approximately the same reflectance as that of the stimulable phosphor at a part on the scanning line of the stimulating ray in order to detect the light other than the light emitted from the stimulable phosphor, or by placing a phosphor sheet the stored energy level of which is known at the read-out section prior to the read-out of the phosphor sheet carrying a radiation image stored thereon in order to detect the light emitted from a section other than the phosphor sheet carrying the radiation image to be read out and, thereafter, using the detected value as the compensation value and subtracting it from the value obtained from the read-out of the phosphor sheet.

Figure 3:
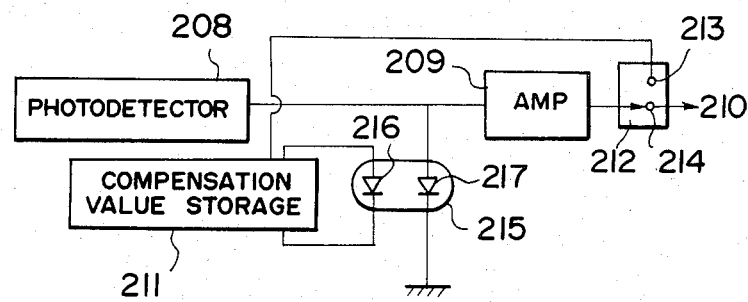
FIG. 3 is a circuit diagram showing a part of the apparatus in accordance with the present invention.

FIG. 3 shows a circuit usable for the above purpose. When the compensation value is to be measured, a switching circuit 212 is connected to a contact 213 so as to input the compensation value detected by the photodetector 208 and amplified by the amplifier 209 into a compensation value storing circuit 211 to store the compensation value therein. When a radiation image is read out, the switching circuit 212 is connected to a contact 214 so as to transfer the output of the amplifier 209 to the output unit 210 such as a CRT. The current corresponding to the compensation value is subtracted from the current corresponding to the radiation image, which is obtained from the photodetector 208, before the latter current reaches the amplifier 209. Specifically, an LED 216 emits light of the level corresponding to the compensation value stored in the compensation value storing circuit 211, and a photo diode 217 receives the emitted light and makes the current corresponding to the compensation value leak out. The reason why the compensation is effected before the signal enters the amplifier 209 is that band compression such as log-conversion is usually necessary to obtain information of four digits and, therefore, a log amplifier is used as the amplifier 209. Namely, it becomes difficult to effect compensation after the log-conversion since the compensation value changes according to the signal level, and therefore, it is desirable to conduct compensation in the linear region prior to the log-conversion. A photo coupler 215 is used since it is resistant to noise and suitable for processing a weak signal. The photo diode 217 in the photo coupler 215 may be replaced by a photomultiplier. The amplifier 209 should preferably be so that the gain thereof can be changed between the steps for detecting the compensation value and the radiation image. Namely, since the compensation value is very small, the gain of the amplifier 209 should preferably be increased to correctly detect the compensation value.

FIG. 4 shows a further embodiment of the apparatus in accordance with the present invention, in which the preliminary read-out section and the final read-out section are formed by a common section. After a stimulable phosphor sheet 1 is exposed to a radiation such as X-rays passing through an object to have a radiation image stored thereon, it is sent to the read-out apparatus shown in FIG. 4. In the read-out apparatus, the preliminary read-out is first carried out. A laser beam 3 emitted from a laser source 2 is passed through a beam expander 4, and the beam diameter of the laser beam 3 is strictly adjusted. Then, the laser beam 3 is passed through an ND filter 5, a prism 6 and a concave lens 7 to reduce the strength of the laser beam 3 and increase the beam diameter thereof. Then, the laser beam 3 is one-dimensionally deflected by a light deflector 8 such as a galvanometer mirror and directed onto the stimulable phosphor sheet 1 by a plane reflection mirror 9. Between the light deflector 8 and the plane reflection mirror 9 is positioned an $f\theta$ lens 10 for maintaining the beam diameter of the laser beam 3 uniform during the scanning of the laser beam 3 on the phosphor sheet 1. As the laser source 2 is selected a laser source emitting a laser beam 3 having a wavelength distribution different from and far apart from the wavelength distribution of the light emitted from the stimulable phosphor sheet 1. While the laser beam 3 impinges upon the stimulable phosphor sheet 1, the phosphor sheet 1 is moved in the direction of the arrow 11 (subsidiary scanning direction) and, consequently, the while area of the phosphor sheet 1 is exposed to and scanned with the laser beam 3. The power of the laser source 2, the beam diameter of the laser beam 3, the scanning speed of the laser beam 3, and the moving speed of the phosphor sheet 1 are selected so that the stimulation energy of the laser beam 3 for preliminary read out is smaller than the stimulation energy of the laser beam for final read out. When exposed to the laser beam 3, the stimulable phosphor sheet 1 emits light in the pattern of the X-ray energy stored therein, and the emitted light enters a light guiding sheet 12. The light guiding sheet 12 may be of the same type as those used in the embodiments shown in FIGS. 1 and 2. The light guided in the interior of the light guiding sheet 12 and emitted from the light output face thereof is received by a photodetector 13.

The light receiving face of the photodetector 13 is provided with a filter for transmitting only the light having the wavelength distribution of the light emitted from the stimulable phosphor sheet 1 and cutting off the light having the wavelength distribution of the stimulating ray, so that the photodetector 13 can detect only the light emitted from the stimulable phosphor sheet 1 upon stimulation thereof. The output of the photodetector 13 is amplifier by an amplifier 15 via a switch 14 and displayed as a visible image on an output unit 16 such as a CRT. By watching the visible image, it is possible to investigate the image input information of the radiation image, i.e. the image input condition or the image input pattern prior to the final read-out. On the basis of the image input information, an input unit 23 connected to a control circuit 17 is manually operated to generate an amplification degree setting value (a), a scale factor setting value (b) and an image processing condition setting value (c). Further, since the position of the phosphor sheet 1 relative to the radiation image read-out apparatus can be found by watching the visible image displayed on the output unit 16 such as a CRT, it is possible to accurately determine the relative position of the phosphor sheet 1 prior to the final read-out by installing a position control means when a superposition method or a subtraction method requiring high precision positioning is used.

When the preliminary read-out is finished, the stimulable phosphor sheet 1 is once returned to the read-out starting position 18 by a reverse rotation of a subsidiary scanning motor (not shown), and then the final read-out is started. In the final read-out, the laser beam 3 is emitted from the laser source 2 in the same way as in the preliminary read-out. However, in the final read-out, the ND filter 5, the prism 6 and the concave lens 7 are moved away from the optical path in the direction of the arrow 19. Therefore, after the beam diameter of the laser beam 3 is strictly adjusted by the beam expander 4, the laser beam 3 directly reaches the light deflector 8 such as a galvanometer mirror and one-dimensionally deflected onto the phosphor sheet 1 via the plane reflection mirror 9. Between the light deflector 8 and the plane reflection mirror 9 is positioned the f$\theta$ lens 10 for maintaining the beam diameter of the laser beam 3 uniform during the scanning of the laser beam 3 on the stimulable phosphor sheet 1. While the laser beam 3 impinges upon the stimulable phosphor sheet 1, the phosphor sheet 1 is moved at a predetermined speed in the direction of the arrow 1 (subsidiary scanning direction) and, consequently, the whole area of the phosphor sheet 1 is exposed to and scanned with the laser beam 3. Upon exposure to the laser beam 3, the stimulable phosphor sheet 1 emits light in the pattern of the X-ray energy stored therein. The light emitted enters a light guiding sheet 12 and is detected by the photodetector 13 in the same way as in the preliminary read-out. The output of the photodetector 13 is sent through the switch 14 to a final read-out amplifier 20 the sensitivity of which has been set by the amplification degree setting value (a), and amplified to an appropriate level. The amplified electric signal is inputted into an A/D converter 21, in which it is converted to a digital signal with a scale factor which has been set by the scale factor setting value (b) to suit the width of signal fluctuation. The digital signal thus obtained is sent to a signal processing circuit 22, in which it is processed based on the image processing condition setting value (c) so as to obtain a radiation image suitable for viewing and diagnostic purposes. The signal is then sent to a reproducing apparatus for reproducing a visible radiation image.

in the reproducing apparatus, a visible image is reproduced based on the image signal processed by the signal processing circuit 22. The reproduction may be conducted in various ways; for example, the radiation image may be recorded on a light-sensitive material by scanning it with a laser beam, electronically displayed on a CRT or the like, recorded by a video tape recorder or a printer, or recorded on a thermosensitive recording material by using heat wave.

FIG. 5 shows a still further embodiment of the apparatus in accordance with the present invention, in which the preliminary read-out section and the final read-out section are formed by a common section. The apparatus shown in FIG. 5 is similar to that shown in FIG. 4, except that the read-out conditions and the image processing conditions in the final read-out operation are automatically controlled by use of the image input information of the X-ray image stored in the stimulable phosphor, which is obtained in the preliminary read-out. Namely, the light emitted from the phosphor sheet 1 upon stimulation thereof and detected by the photodetector 13 in the preliminary read-out is converted to an electric signal, and then sent to the preliminary read-out amplifier 15 via the switch 14. The amplifier 15 has a dynamic range covering a four-digit change in the signal level of the photodetector 13. The output of the amplifier 15 is sent to the control circuit 17, which generates an amplification degree setting value (a), a scale factor setting value (b) and an image processing condition setting value (c) based on the obtained image input information. The light emitted from the phosphor sheet 1 and detected by the photodetector 13 in the final read-out is converted to an electric signal, and sent through the switch 14 to the final read-out amplifier 20 the sensitivity of which has been set by the amplification degree setting value (a). The electric signal is amplified to an appropriate level by the amplifier 20, and then sent to the A/D converter 21. In the A/D converter 21, the electric signal is converted to a digital signal with a scale factor has been set by the scale factor setting value (b) to suit the width of signal fluctuation. The digital signal thus obtained is sent to the signal processing circuit 22, in which it is processed based on the image processing condition setting value (c) so as to obtain a radiation image suitable for viewing and diagonstic purposes. The signal is then sent to a reproducing apparatus for reproducing a visible radiation image.

It should be understood that the present invention can be embodied in various ways other than the above described embodiments.

For example, the preliminary read-out may not always be conducted over the whole surface of the stimulable phosphor sheet. Normally, in the case of a radiograph, there is no image to be read out at the marginal portions of the phosphor sheet and, therefore, the preliminary read-out may be omitted for the marginal portions having a width of several centimeters. When the region carrying the necessary radiation image is known in advance, it is sufficient that only the region is read out preliminarily. Thus, it is possible to reduce the read-out time by conducting the preliminary read-out only for the necessary image region.

It is also possible to position two light guiding sheets with the scanning line intervening therebetween, or to employ a reflection mirror in combination with the light guiding sheet as disclosed in Japanese Unexamined Patent Publication No. 56(1981)-11398.

Instead of forming the photodetector integrally with the light guiding sheet, it is also possible to employ a linear sensor comprising a plurality of photomultipliers or photo transistors positioned along a straight line in the direction of the main scanning. Further, the whole surface of the stimulable phosphor sheet may be exposed to a stimulating ray at a time, and a photodetector capable of two-dimensionally detect light, such as a television camera, may be used to detect the light emitted from the whole surface of the stimulable phosphor sheet.

Figure 6:
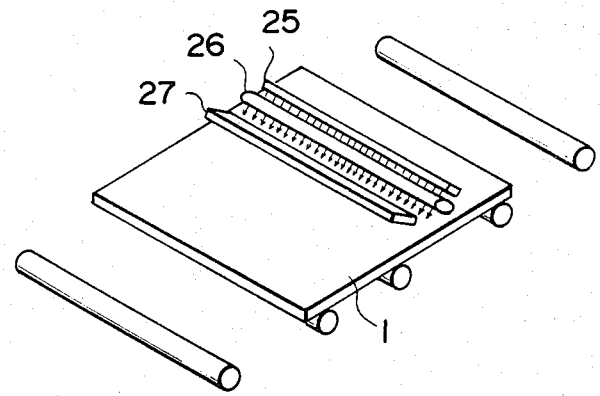
FIG. 6 is a schematic diagram showing a modified form of a part of the apparatus in accordance with the present invention.

FIG. 6 shows a modified form of the stimulating ray source. As shown in FIG. 6, the laser source for emitting the stimulating ray may be replaced by an LED array 25 having a wavelength range different from that of light emitted from the stimulable phosphor upon stimulation thereof. In this case, it is possible to omit the light deflector such as a galvanometer mirror. In FIG. 6, a condenser lens 26 is positioned to effectively condense light emitted from the LED array 25 on the phosphor sheet 1, and a linear sensor 27 is employed as the photodetector.

Instead of adjusting the read-out gain by changing the amplification degree of the amplifier connected to the photodetector, it is possible to use a photomultiplier as the photodetector and directly changing the gain of the photodetector by changing the voltage applied to the photomultiplier. This method is advantageous in that only the image signal is amplifier, while noise is not amplified.

In the above described embodiments, the final read-out conditions and the image processing conditions are determined on the basis of the image input information obtained by the preliminary read-out. However, in the cases of the portion image, plain image, and contrasted image radiography, it is also possible to use an auxiliary input unit for setting the conditions.

In the embodiments shown in FIGS. 1 and 2, the laser source 201 at the preliminary read-out section 2 and the laser source 301 at the final read-out section 3 need not necessarily be formed separately from each other. Namely, a single laser source may be used, and the laser beam emitted therefrom may be divided by use of a semi-transparent mirror or the like.

In the embodiments shown in FIGS. 1 and 4, the final read-out conditions are set by manually operating the control circuits 314 and 17 based on the visible image obtained by the preliminary read-out. However, it is also possible to form the control system so that the visible image displayed on the output units 210 and 16 becomes identical with the visible image to be actually obtained for viewing and diagnostic purposes according to the operation of the control circuits 314 and 17. In this case, it becomes easier for the control circuits to set the conditions for achieving adequate processings.

In the embodiments shown in FIGS. 4 and 5, the stimulable phosphor sheet is returned to the final read-out starting position by reversely rotating the subsidiary scanning motor after the preliminary read-out is finished. However, returning to the read-out starting position may be conducted by switching the drive system. It is also possible to set the image processing conditions and the read-out conditions after the preliminary read-out is finished, and conduct the final read-out while the stimulable phosphor sheet is moved reversely by the reverse rotation of the subsidiary scanning motor or by switching the drive system. Further, instead of using the ND filter and the concave lens to make the stimulation energy of the stimulating ray in the preliminary read-out smaller than the stimulation energy in the final read-out, it is possible to increase the beam diameter only with the concave or by replacing the concave lens with a beam expander. It is also possible to employ a laser source having low power and an optical path switching means.

Further, instead of directly reproducing and recording the radiation image by use of the laser source, the final signal obtained at the final read-out section may be displayed on an output unit such as a CRT, or the final radiation image displayed on a CRT or the like may be recorded by use of a video tape recorder or a printer. Alternatively, the radiation image may be recorded on a thermosensitive recording material by use of heat wave, or may be recorded by electrophotography.

We claim:

1. In a radiation image read-out method in which a stimulable phosphor sheet which has been subjected to image-wise radiation exposure to produce a radiation image stored thereon is exposed to a stimulating ray which causes the stimulable phosphor sheet to emit light in the pattern of the stored image, and the emitted light is photoelectrically read out, the radiation image read-out method comprising:
   prior to final read-out for obtaining a visible image for viewing purposes, conducting preliminary read-out for reading out said radiation image stored on said stimulable phosphor sheet by exposing said stimulable phosphor sheet to a stimulating ray having stimulation energy lower than stimulation energy of a stimulating ray used in said final read-out, the preliminary read-out exposure being conducted subsequent to said image wise radiation exposure.

2. A method as defined in claim 1 wherein image input information obtained by the preliminary read-out is monitored to set read-out conditions for the final read-out and/or image processing conditions.

3. A method as defined in claim 1 wherein read-out conditions for the final read-out and/or image processing conditions are automatically set based on image input information obtained by the preliminary read-out.

4. A method as defined in any of claims 1 to 3 wherein said preliminary read-out and said final read-out are conducted by scanning said stimulable phosphor sheet with the respective stimulating rays.

5. A method as defined in claim 4 wherein the scanning speed in said preliminary read-out is higher than the scanning speed in said final read-out.

6. A method as defined in claim 5 wherein said preliminary read-out is conducted within one hour before said final read-out.

7. A method as defined in claim 4 wherein the beam diameter of the stimulating ray in said preliminary read-out is larger than the beam diameter of the stimulating ray in said final read-out.

8. A method as defined in claim 7 wherein said preliminary read-out is conducted within one hour before said final read-out.

9. A method as defined in claim 4 wherein said preliminary read-out is conducted within one hour before said final read-out.

10. A method as defined in any of claims 1 to 3 wherein said preliminary read-out is conducted within one hour before said final read-out.

11. A radiation image read-out apparatus including a stimulating ray emitting means for emitting a stimulating ray to a stimulable phosphor sheet which has been subjected to image-wise radiation exposure to produce a radiation image stored thereon, a means for moving said stimulable phosphor sheet, and a light detecting means for photo-electrically reading out light emitted from said stimulable phosphor sheet in the pattern of the radiation image stored thereon upon exposure thereof to said stimulating ray, said apparatus comprising preliminary read-out means for reading out said radiation image stored on said stimulable phosphor sheet subsequent to said image-wise radiation exposure, said preliminary read-out means emitting, subsequent to said image-wise radiation exposure, a stimulating ray for preliminary read-out having stimulation energy lower than stimulation energy of said stimulating ray for final read-out of said stimulable phosphor sheet.

12. An apparatus as defined in claim 11 wherein said stimulating ray emitting means is provided with an adjusting means for generating stimulation energy of said stimulating ray in the preliminary read-out lower than stimulation energy of said stimulating ray in the final read-out.

13. An apparatus as defined in claim 12 wherein there is provided a monitor means for displaying the output of the light detecting means for the preliminary read-out.

14. An apparatus as defined in claim 12 wherein there is provided an input unit for inputting read-out conditions in final read-out and/or image processing conditions based on image input information obtained by said preliminary read-out.

15. An apparatus as defined in claim 13 wherein there is provided an input unit for inputting read-out conditions in said final read-out and/or image processing conditions based on image input information obtained by said preliminary read-out.

16. An apparatus as defined in claim 12 wherein there is provided a control means for setting read-out conditions in final read-out and/or image processing conditions based on image input information obtained by said preliminary read-out.

17. An apparatus as defined in any of claims 12 to 16 wherein said stimulating ray emitting means makes the stimulating ray scan on said stimulable phosphor sheet.

18. An apparatus as defined in claim 11 wherein the means for emitting the stimulating ray for the preliminary read-out, a means for moving said stimulable phosphor sheet for the preliminary read-out, and a light detecting means for photoelectrically reading out light emitted from said stimulable phosphor sheet in the pattern of the radiation image stored thereon upon exposure to the stimulating ray for preliminary read-out are provided separately from the stimulating ray emitting means for the final read-out, the means for moving said stimulable phosphor sheet for the final read-out, and the light detecting means for photoelectrically reading out light emitted from said stimulable phosphor sheet in the pattern of the radiation image stored thereon upon exposure thereof to the stimulating ray for the final read-out.

19. An apparatus as defined in claim 18 wherein there is provided a monitoring means for displaying the output of the light detecting means for the preliminary read-out.

20. An apparatus as defined in claim 18 wherein there is provided an input means for inputting read-out conditions in final read-out and/or image processing conditions based on image input information obtained by said preliminary read-out.

21. An apparatus as defined in claim 19 wherein there is provided an input means for inputting read-out conditions in final read-out and/or image processing conditions based on image input information obtained by said preliminary read-out.

22. An apparatus as defined in claim 18 wherein there is provided a control means for setting read-out conditions for the final read-out and/or image processing conditions based on the output of the light detecting means for the preliminary read-out.

23. An apparatus as defined in any of claims 18 to 22 wherein the stimulating ray emitting means for the final read-out and the means for emitting the stimulating ray for the preliminary read-out make the respective stimulating rays scan on said stimulable phosphor sheet.

* * * * *